S. RHINEHART.
Couplings for Air and Steam-Brakes.
No. 152,413. Patented June 23, 1874.
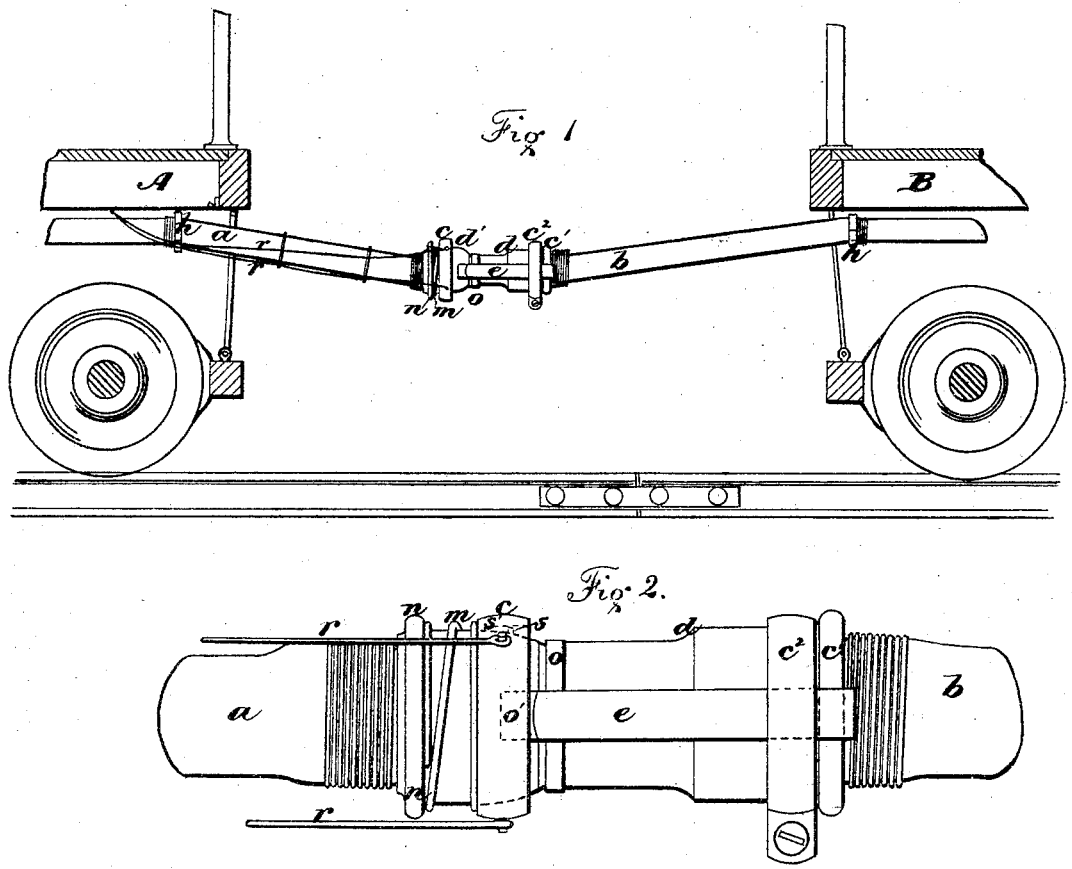

UNITED STATES PATENT OFFICE.

SAMUEL RHINEHART, OF CLEVELAND, OHIO, ASSIGNOR OF TWO-THIRDS HIS RIGHT TO FRANK D. CASSIDY AND DALLIS G. STEESE, OF SAME PLACE.

IMPROVEMENT IN COUPLINGS FOR AIR AND STEAM BRAKES.

Specification forming part of Letters Patent No. 152,413, dated June 23, 1874; application filed May 21, 1874.

*To all whom it may concern:*

Be it known that I, SAMUEL RHINEHART, of Cleveland, in the county of Cuyahoga and State of Ohio, have invented a new and useful Improvement in Couplings for Air and Steam Brakes; and I do hereby declare the following to be a full, clear, and exact description of the same, reference being had to the accompanying drawings, forming part of this specification, in which—

Figure 1 is a side elevation of my improved coupling applied to the hose of an air or steam brake, the collar being moved backward for the uncoupling of the joint; and Fig. 2 is a similar view, showing the hose coupled.

Similar letters of reference in the accompanying drawings denote the same parts.

The couplings of the hose of air and steam brakes, as ordinarily constructed, consist of two tubes, one inserted in the other, and the two coupled together by hooked springs attached to one engaging with a flange on the opposite tube.

In this construction, it is found, in practice, that the hose is extremely liable to blow apart or become uncoupled by the action of the air or steam forced through the hose, which renders the brake inoperative.

To remedy this defect, in the class of couplings referred to, is the object of my invention, which consists, first, in the employment of a collar encircling one of the tubes of the coupling, and made to surround the bent ends of the springs attached to the other half of the coupling to retain the springs in engagement with the flange of the coupling.

My invention further consists in the employment of a spring, preferably a coiled or helical one, surrounding the coupling behind the collar, the tension of the coiled spring operating to force the sliding collar around the hooked springs, and retain them in engagement with the flange on one-half the couplings, the sliding collar having rods attached to it and one of the cars, so that, if an accident occurs, the collar will be withdrawn from its normal position over the hooked springs, and the joint will become uncoupled, thus obviating the danger of breaking the hose.

In the accompanying drawings, A and B represent the platforms of two cars, provided with hangers or bearings $h$ $h$ for the hose. $d$ represents one-half of the coupling, to which the hose $b$ is securely attached steam or air tight. The part $d$ of the coupling is provided with a collar, $c^1$, at its rear, over which the ends of the springs $e$ $e$ are bent, the latter also passing through slots in the collar $c^2$, by which the hooked springs $e$ $e$ are securely attached to the tubular part $d$ of the coupling. The forward ends of the springs $e$ $e$ are bent right angularly, and beveled, as seen at $o'$, to engage with the beveled flange $o$, and couple the parts together. The opposite half $d'$ of the tubular coupling consists of the flange $n$, provided with a groove or recess for the reception of a coiled spring, $m$, encircling the coupling, the opposite end of said spring having its seat in a corresponding groove or recess in the collar $c$, the tension of the spring operating to move the collar forward over the bent ends of the springs $e$ $e$. The beveled flange $o$ is provided with two depressions in its circumference, to enable the hooked springs $e$ $e$ to be withdrawn from engagement with the beveled flange $o$ when it is desired to uncouple the hose. The collar $c$ has a shoulder, $s'$, formed on its inner cylindrical face, which engages with slots $s$ $s$ on the rounded surface of the part $d'$ of the coupling. This construction limits the play of the collar on the coupling. $r$ $r$ are flexible rods or cords, attached to the collar $c$, preferably thence passing through eyes or guides on the hose to prevent their sagging, and thence passing under the platform, and attached thereto, the flexible rods or cords being shorter than the hose.

By this construction it will be seen that the collar employed securely retains the hooked springs $e$ $e$ in their seats, and prevents the blowing apart of the coupling from the pressure of the air or steam, and that, if any accident occurs, the car to which the flexible rods or cords are attached will through them withdraw the collar from over the hooked springs, when the latter will be withdrawn from engagement with the flange, and the joint be uncoupled without liability of breakage of the hose.

Having thus described my invention, what I claim is—

1. The half-coupling $d$, provided with the hooked springs $e\ e$, in combination with the collar $c$ and the half-coupling $d'$, having the flange $o$, substantially as described.

2. The half-couplings $d\ d'$, constructed as set forth, in combination with the sliding collar $c$, coiled spring $m$, and flexible connections $r\ r$, substantially as described, and for the purpose set forth.

SAMUEL RHINEHART.

Witnesses:
NATHAN K. ELLSWORTH,
MELVILLE CHURCH.